(12) United States Patent
Braedt

(10) Patent No.: US 8,360,911 B2
(45) Date of Patent: Jan. 29, 2013

(54) MULTIPLE SPROCKET ASSEMBLY

(75) Inventor: Henrik Braedt, Würzburg (DE)

(73) Assignee: SRAM Deutschland GmbH (DE)

( * ) Notice: Subject to any disclaimer, the term of this patent is extended or adjusted under 35 U.S.C. 154(b) by 268 days.

(21) Appl. No.: 12/389,780

(22) Filed: Feb. 20, 2009

(65) Prior Publication Data

US 2009/0215566 A1 Aug. 27, 2009

(30) Foreign Application Priority Data

Feb. 23, 2008 (DE) .......................... 10 2008 010 904

(51) Int. Cl.
*F16H 55/30* (2006.01)
(52) U.S. Cl. ........................................... 474/164
(58) Field of Classification Search .................. 474/158, 474/160, 164, 78
See application file for complete search history.

(56) References Cited

U.S. PATENT DOCUMENTS

| | | | | |
|---|---|---|---|---|
| 3,477,303 | A * | 11/1969 | Brilando | 474/144 |
| 3,478,614 | A * | 11/1969 | Shimano | 474/160 |
| 4,044,621 | A | 8/1977 | McGregor, Sr. et al. | |
| 4,198,876 | A * | 4/1980 | Nagano | 474/160 |
| 4,380,445 | A | 4/1983 | Shimano | |
| 4,439,172 | A * | 3/1984 | Segawa | 474/160 |
| 4,472,163 | A * | 9/1984 | Bottini | 474/160 |
| 4,642,075 | A | 2/1987 | Nagashima | |
| 4,741,724 | A | 5/1988 | Wang | |
| 5,503,600 | A | 4/1996 | Berecz | |
| 5,772,547 | A | 6/1998 | Terada | |
| 5,935,033 | A * | 8/1999 | Tseng et al. | 474/160 |
| 5,954,604 | A * | 9/1999 | Nakamura | 474/160 |
| 5,980,407 | A | 11/1999 | Takamori et al. | |
| 7,118,505 | B2 * | 10/2006 | Lee | 474/160 |
| 2002/0193194 | A1 | 12/2002 | Okabe | |
| 2008/0004143 | A1 * | 1/2008 | Kanehisa et al. | 474/160 |
| 2008/0188336 | A1 * | 8/2008 | Tokuyama | 474/160 |
| 2008/0230344 | A1 * | 9/2008 | Braedt | 192/64 |
| 2008/0231014 | A1 * | 9/2008 | Braedt | 280/260 |
| 2008/0234082 | A1 * | 9/2008 | Braedt | 474/116 |
| 2009/0215565 | A1 * | 8/2009 | Braedt | 474/160 |
| 2010/0004081 | A1 * | 1/2010 | Braedt | 474/160 |
| 2010/0075791 | A1 * | 3/2010 | Braedt | 474/160 |

FOREIGN PATENT DOCUMENTS

| | | |
|---|---|---|
| DE | 25 35 943 | 3/1976 |
| DE | 197 42 524 | 4/1998 |
| DE | 102 25 977 | 12/2002 |
| DE | 696 31 437 | 12/2004 |
| DE | 20 2004 019 270 | 4/2005 |
| DE | 20 2007 014 445 | 12/2007 |
| EP | 05 10 371 | 12/2004 |
| JP | 51 021633 | 2/1976 |
| JP | 51 021634 | 2/1976 |
| JP | 55 099992 | 7/1980 |

* cited by examiner

*Primary Examiner* — Thomas B Will
*Assistant Examiner* — Joan D Misa
(74) *Attorney, Agent, or Firm* — Milan Milosevic; Lisa Serdynski; Steven Courtright

(57) ABSTRACT

A multiple sprocket assembly receives a chain and transfers torque therefrom to a rear wheel hub of a bicycle. The multiple sprocket assembly includes a plurality of different-sized multiple-toothed sprockets arranged coaxially about the rear wheel hub. A plurality of annular support elements extend between the sprockets and have a plurality of openings disposed circumferentially on the annular support element. The openings are aligned with tooth gaps of an adjoining smaller sprocket. The sprockets and the annular support elements are configured to transmit torque from the smaller sprocket to a larger sprocket.

13 Claims, 1 Drawing Sheet

MULTIPLE SPROCKET ASSEMBLY

BACKGROUND OF THE INVENTION

The present invention relates to multiple sprocket assemblies and more particularly, to a multiple sprocket assembly having a different-sized, multiple-toothed sprockets and annular support elements extending between the sprockets, the annular support elements including openings spaced apart by connectors.

Typically, a multiple sprocket assembly or cassette includes a plurality of different-sized sprockets arranged coaxially and mounted on a driver of a wheel hub. The teeth of each rotating sprocket alternately engage a chain to transmit a torque to the driver, the sprockets rotationally coupled to the driver through a profile. Since each individual sprocket transmits torque to the driver, the profile areas of the driver and the sprocket are necessarily thick and heavy. To lighten the bicycle for racing purposes, the sprockets are made of lighter materials with openings However, lighter materials are disadvantaged in regard to hardness, deformation and wear.

SUMMARY OF THE INVENTION

The present invention provides a multiple sprocket assembly mountable to a driver of a rear wheel hub. In one embodiment of the present invention, the multiple sprocket assembly includes two parts mountable to the driver. The first part is a largest sprocket having a profile on its smallest diameter to matingly engage a profile of the driver to rotationally couple the largest sprocket to the driver. The second part is a hollow conical body including a plurality of annular supporting elements and a plurality of different-sized, multiple-toothed sprockets arranged coaxially about the hub in increasing diameter. The annular support elements are configured in a stepped arrangement to form the hollow conical body. Each annular support element includes an annular cylinder and an annular disc. To maximize strength, the annular cylinder is generally perpendicular to the annular disc. The smallest diameter sprocket of the hollow conical body includes a profile to radially center the hollow conical body against the driver. The plurality of sprockets and the plurality of annular support elements may embody a single piece. The largest sprocket is fixedly connected to the hollow conical body by a connection which may be formed by welding, joining, riveting, plugging or the like.

The hollow conical body includes openings disposed about its circumference. The openings are located on the support elements and are substantially aligned with the tooth gaps of the adjoining smaller sprocket. The openings are spaced about by connectors substantially aligned with the teeth of the adjoining smaller sprocket. The opening extends from the tooth gap of the smaller sprocket, continues in the annular cylinder and the annular disc and extends to the adjoining larger sprocket. The annular discs are generally perpendicular to the annular cylinders and have a width such that forces may be transmitted from the chain without inelastic deformation of the hollow conical body.

Each connector includes a first end point located on the smaller sprocket and a second end point located on the adjoining larger sprocket. The second end point is disposed forward of the first end point in the drive rotation direction. Specifically, it has been shown that the connectors transmit the torque best if the second end points are situated on the larger sprockets forward of the first end points in the drive rotation direction, whereby the connectors form an angle relative to a radial beam in the annular disc of the support element.

The openings reduce the weight of the multiple sprocket assembly and channel dirt away from the sprocket assembly while riding under unfavorable conditions. Dirt is channeled away from the sprocket assembly and through openings in the largest sprocket. The rollers of the chain push the dirt through the support element openings located under the tooth gaps and to keep the chain securely coupled to the sprocket assembly even under unfavorable conditions. Because of the configuration of the openings in the axial direction through the annular discs of the annular support elements as well, the dirt may also be displaced in the axial direction by the action of the chain rollers.

The force of the chain is transmitted to one of the sprockets as torque and is transmitted in the hollow conical body to the next larger sprocket and ultimately to the largest sprocket and to the hub driver via the profile. Therefore, the profile in the largest sprocket must be properly sized to resist wear and surface pressure over an extended period of time.

The present invention provides a method for producing a multiple sprocket assembly having a hollow conical body and a plurality of different-sized multiple-toothed sprockets for receiving a chain and transferring torque therefrom to a rear wheel hub of a bicycle. The hollow conical body has a plurality of annular support elements extending between the sprockets. The annular support elements have a plurality of openings. The method includes the steps of producing a blank hollow conical body by lathing it from solid stock or machining it from a re-shaped starting part. Tooth gaps and the openings are milled into the sprockets and annular support elements, respectively. Shifting aids are milled into tooth front faces of the sprockets. A connection is formed between the hollow conical body and an independent largest sprocket. The hollow conical body is heat treated and surface treated before mounting the largest sprocket to the hollow conical body.

These and other features and advantages of the present invention will be more fully understood from the following description of one or more embodiments of the invention, taken together with the accompanying drawings.

DETAILED DESCRIPTION

Figure 1:
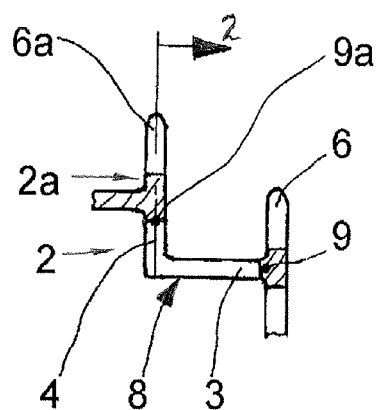
FIG. 1 is a partial cross-sectional view of a multiple sprocket assembly according to one embodiment of the present invention.
Figure 2:
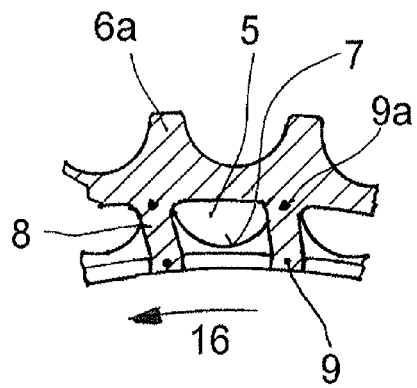
FIG. 2 is a partial cross-sectional view of the sprocket assembly of FIG. 1.
Figure 3:
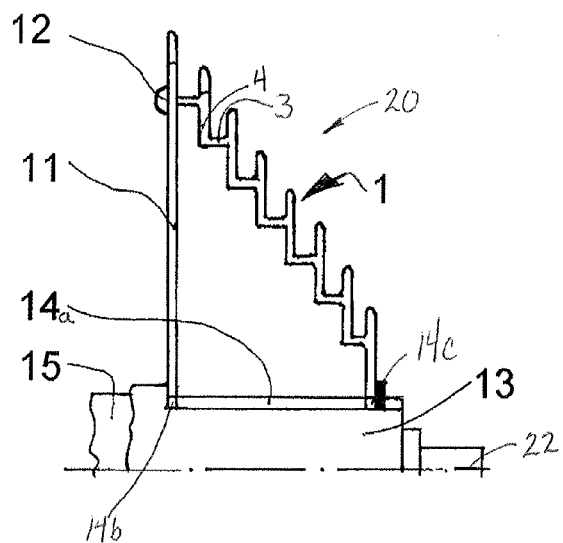
FIG. 3 is a cross-sectional schematic of the multiple sprocket assembly mounted on a driver of a rear wheel hub.

FIGS. 1-3 illustrate a multiple sprocket assembly 20 according to one embodiment of the present invention. The multiple sprocket assembly 20 includes a hollow conical body 1 having a plurality of annular support elements 2 and a plurality of different-sized, multiple-toothed sprockets 6 supported by the annular support elements 2. Each annular support element 2 includes an annular cylinder 3 and an annular disc 4. Structure 2 is to be understood comprising a number of sub-portions, i.e., a cylindrical part 3 and a disk-shaped part 4 as well as a sprocket 6, the disc-shaped part and sprocket being connected in one piece to the cylindrical part 3. A next larger element 2a comprises similar parts as that of structure 2 i.e. a next size of cylindrical part disk-shaped cart and sprocket adjacent and adjoining structure 2. The annular cylinders 3 extend along a hub axis 22 and have varying diameters. The annular discs 4 extend radially of the hub axis 22 and have varying diameters. The annular cylinders 3 and discs 4 are alternatingly arranged in a stepped sequence to form the hollow conical body 1. The annular support elements 2 and the sprockets 6 embody a single piece.

Looking to FIG. 2, openings 5 extend from below the larger sprocket 6a in the annular disc 4 to the annular cylinder 3 of the annular support element 2 and are substantially aligned with a tooth gap 7 of the adjoining smaller sprocket 6. The openings 5 allow dirt to pass through the multiple sprocket assembly. Connectors 8 are formed between the openings 5 and extend between the two shown sprockets 6 and 6a. Each connector 8 includes a first end point 9 located on the smaller sprocket 6 and a second end point 9a located on the adjoining larger sprocket 6a. The second end point 9a is disposed forward of the first end point 9 in the drive rotation direction 16. Finally, the annular disc 4 is generally perpendicular to the annular cylinder 3.

Looking to FIG. 3, the multiple sprocket assembly 20 includes a largest sprocket 11 and the hollow conical body 1 mounted on a driver 13 of a rear wheel hub 15 of a bicycle. The largest sprocket 11 is fixedly connected to the hollow conical body 1 by a connection 12 which may be formed by welding, joining, riveting, plugging or the like. The driver 13 includes a profile 14a rotationally coupled to a profile 14b of the largest sprocket 11. The hollow conical body 1 includes a profile 14c for centering the hollow conical body 1 on the driver 13 of the hub 15. Alternatively, the hollow conical body 1 may include a profile rotationally coupled to the profile 14a of the driver 13.

While this invention has been described by reference to one or more embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A multiple sprocket assembly for receiving a chain and transferring torque therefrom to a rear wheel hub of a bicycle, the multiple sprocket assembly comprising:
a plurality of different-sized multiple-toothed sprockets arranged coaxially about the rear wheel hub; and
a plurality of annular support elements extending between the sprockets and having a plurality of openings disposed circumferentially on the annular support element, the openings aligned with tooth gaps of an adjoining smaller sprocket of said plurality of sprockets,
a plurality of connectors, each of the plurality of connectors formed of part of one of the plurality of annular support elements;
the sprockets and the annular support elements configured to transmit torque from the smaller sprocket of said plurality of sprockets to a larger sprocket of said plurality of sprockets, and wherein the connectors are substantially aligned along a hub axis with, the teeth of the adjoining smaller sprocket, wherein each annular support element includes an annular cylinder and an annular disc, the plurality of annular support elements and the plurality of sprockets embodying a single piece.

2. The multiple sprocket assembly of claim 1, wherein the annular support elements are configured in a stepped sequence to form a hollow conical body.

3. The multiple sprocket assembly of claim 2, wherein the annular support elements include the plurality of openings spaced apart by the plurality of connectors.

4. The multiple sprocket assembly of claim 3, wherein the annular disc is generally perpendicular to the annular cylinder.

5. The multiple sprocket assembly of claim 2, further comprising a largest sprocket fixedly connected to the hollow conical body.

6. The multiple sprocket assembly of claim 5, wherein one of the largest sprocket and the hollow conical body is rotationally coupled to a driver via a profile.

7. The multiple sprocket assembly of claim 1, wherein each connector includes a first end point located on the smaller sprocket and a second end point located on the adjoining larger sprocket, the second end point disposed forward of the first end point in a drive rotation direction.

8. The multiple sprocket assembly of claim 7, further comprising a largest sprocket fixedly connected to the hollow conical body.

9. The multiple sprocket assembly of claim 8, wherein one of the largest sprocket and the hollow conical body is rotationally coupled to a driver via a profile.

10. The multiple sprocket assembly of claim 1, wherein the annular support elements include the plurality of openings spaced apart by the plurality of connectors.

11. The multiple sprocket assembly of claim 10, wherein the annular disc is generally perpendicular to the annular cylinder.

12. The multiple sprocket assembly of claim 11, wherein each connector includes a first end point located on the smaller sprocket and a second end point located on the adjoining larger sprocket, the second end point disposed forward of the first end point in a drive rotation direction.

13. A multiple sprocket assembly for receiving a chain and transferring torque therefrom to a rear wheel hub of a bicycle, the multiple sprocket assembly comprising:
a plurality of different-sized multiple-toothed sprockets arranged coaxially about the rear wheel hub;
a plurality of annular support elements extending between the sprockets and having a plurality of openings disposed circumferentially on the annular support element, the openings aligned with tooth gaps of an adjoining smaller sprocket of said plurality of sprockets;
a plurality of connectors, each of the plurality of connectors formed of part of one of the plurality of annular support elements, and
the plurality of openings spaced apart by the plurality of connectors, the connectors substantially aligned along a hub axis with teeth of the adjoining smaller sprocket, wherein each annular support element includes an annular cylinder and an annular disc, the plurality of annular support elements and the plurality of sprockets embodying a single piece.

* * * * *